United States Patent [19]

Yasunaga et al.

[11] Patent Number: 4,990,361

[45] Date of Patent: Feb. 5, 1991

[54] METHOD FOR PRODUCING MAGNETIC RECORDING MEDIUM

[75] Inventors: Tadashi Yasunaga; Akio Yanai; Koji Sasazawa, all of Kanagawa, Japan

[73] Assignee: Fuji Photo Film Co., Ltd., Kanagawa, Japan

[21] Appl. No.: 403,075

[22] Filed: Aug. 28, 1989

Related U.S. Application Data

[63] Continuation of Ser. No. 182,819, Apr. 18, 1988.

[30] Foreign Application Priority Data

Apr. 16, 1987 [JP] Japan ................................ 62-94136
Feb. 1, 1988 [JP] Japan ................................ 63-21811

[51] Int. Cl.$^5$ .............................................. H01F 10/02
[52] U.S. Cl. ........................................ 427/36; 427/36; 427/39; 427/45.1; 427/54.1; 427/128; 427/255.2

[58] Field of Search .......................... 427/38, 127–132, 427/48, 255.2, 35, 36, 39, 45.1, 54.1; 428/694, 900

[56] References Cited

U.S. PATENT DOCUMENTS 4,673,610 6/1987 Shirahata et al. .................... 428/213
4,724,156 2/1988 Arai et al. .............................. 427/38

Primary Examiner—Bernard Pianalto
Attorney, Agent, or Firm—Sughrue, Mion, Zinn, Macpeak & Seas

[57] ABSTRACT

A method and apparatus for producing a magnetic recording medium having an improved durability with a simple process. Nitrogen molecules and/or nitrogen atoms in an excited state are applied to a nonmagnetic substrate simultaneously with an iron vapor flow and an ion flow. The resulting magnetic recording medium has superior corrosion resistance and can be produced at a high film forming rate, and is especially suitable for high density recording because of its high coercive force.

15 Claims, 2 Drawing Sheets

METHOD FOR PRODUCING MAGNETIC RECORDING MEDIUM

This is a continuation of application No. 182,819, filed Apr. 18, 1988.

BACKGROUND OF THE INVENTION

The present invention relates to a method for producing magnetic recording medium and an apparatus for producing a magnetic recording medium.

More particularly, the invention relates to a method for producing a magnetic recording medium of the iron nitride thin film type and an apparatus for producing such a recording medium.

A widely used conventional magnetic recording medium is manufactured by applying a magnetic coating in which ferromagnetic powder is dispersed in an organic binder onto a non-magnetic substrate and dried thereon. This coating-type magnetic recording medium, however, has the disadvantages that the saturation magnetization is small because metal oxide powder is mainly used as the ferromagnetic powder, that the concentration of the ferromagnetic material in the magnetic layer cannot be made high due to the presence of the organic binder making the coating-type magnetic recording medium unsuitable for high density recording, and that the manufacturing process for this type of recording medium is complicated.

Recently in response to an increased demand for high density recording, a magnetic recording medium has been developed in which a metal thin film is formed on a nonmagnetic substrate. To produce this magnetic recording medium, a metal thin film is formed on a nonmagnetic substrate by a vapor deposition method such as vacuum deposition, sputtering, or ion plating, or by a plating method such as electroplating or electroless plating. The magnetic recording medium obtained by the foregoing method is termed a magnetic recording medium of the metal thin film type. The magnetic recording medium of this type is not limited to a pure metal thin film, but may have a metal nitride thin film formed by nitriding a metal thin film in the process of forming the metal thin film or a partially oxidized metal thin film formed by partially oxidize a metal thin film. Such magnetic recording media are generally termed thin-film type magnetic recording media. The magnetic recording medium of the thin film type is also sometimes called a magnetic recording medium of the nonbinder type because no organic binder is employed.

Such a magnetic recording medium of the metal thin-film type is attracting attention because ferromagnetic metal having a large saturation magnetization can be formed into a thin film without the use of a binder. As a result, the coercive force can be made high, the film can be made thin in comparison with the coating-type magnetic recording medium, and, in addition, the manufacturing process can be simplified.

The metal thin film of such a metal thin-film type magnetic recording medium appears to the unaided eye to have a uniform and smooth metal surface. Microscopically, however, the metal thin film has a rough surface structure in which metal corpuscles are arranged side by side.

Further, magnetic elements such as Fe, Co and Ni are electrochemically active and do not have a sufficient anti-corrosion efficiency. Therefore, the magnetic recording medium of the metal thin film type suffers from a corrosion problem and is inferior in durability to the magnetic recording medium of the coating type. Particularly, in the case of a magnetic recording medium used in a cassette tape, a video tape, or the like, the surface of the medium is squeezed by a magnetic head during the recording/reproducing operation. If corrosion occurs on the metal thin film, the corroded material may be dislodged from the metal thin film by friction to thereby cause fouling of and possibly damage to the head, even if the amount of corrosion is extremely slight.

Further, as mentioned above, the magnetic recording medium of the metal thin-film type has a problem in that its durability is poor. That is, in a magnetic recording medium of this type large amounts of friction occur because the metal thin film has such a smooth surface that sticking is apt to occur. Therefore, magnetic recording medium of the metal thin film type is inferior in durability or the like during a still-viewing operation in a VTR to a magnetic recording medium of the coating type.

In order to improve the durability of the magnetic recording medium of the metal thin-film type, there have been proposed, for example, a method in which surface nitriding processing is performed by ion plating (see Japanese Unexamined Patent Publication No. 53-33806), a method in which a silicon nitride film is formed by sputtering (see Japanese Unexamined Patent Publication No. 53-30304), a method in which a magnetic film is exposed to a discharge in an atmosphere of nitrogen gas or the like to thereby form a nonmagnetic surface layer (see Japanese Unexamined Patent Publication No. 53-85403/1978), a method in which a metal nitride thin film is formed on a magnetic metal thin film (see Japanese Unexamined Patent Publication No. 54-143111).

For producing a magnetic recording medium of the thin-film type, there has been proposed a method in which iron vapor obtained by heat-evaporation is made incident on a substrate while the substrate is irradiated with ions of a mixed gas containing nitrogen using an ion gun so that a magnetic layer of iron nitride thin film is formed on the substrate (see Japanese Unexamined Patent Publication No. 60-231924).

Particularly, an iron nitride thin film in which at least iron and nitrogen are contained in a magnetic film is seen as promising for a magnetic thin film of the magnetic recording medium of the metal thin-film type because of its high corrosion resistance and its low cost as a raw material (see Japanese Unexamined Patent Publications Nos. 60-28028 and No. 60-236113).

For forming the foregoing iron nitride thin film, first, a method employing reactive ion plating has been proposed (see Japanese Unexamined Patent Publication No. 60-236113 and Japanese Journal of Applied Physics, pp. 1576–1579, vol. 23, 1984). In such a method employing ion plating, however, there are problems in that the degree of vacuum becomes low in forming a film, thereby lowering the quality of the film (for example, deterioration in the squareness ratio), and in that parameter control in forming the film is difficult. Alternatively, there has been proposed a technique in which nitrogen is ionized using an ion gun and a film is formed while the thus obtained ions are applied in the form of an ion flow to a film forming portion (see, for example, Japanese Unexamined Patent Publications Nos. 60-231924 and No. 61-926). According to this method, the energy, the quantity, etc., of the nitrogen ions can be controlled independently of the iron vapor flow to thereby make it possible to form a film of higher quality. The method using a nitrogen ion flow generated by an ion gun, however, has a disadvantage in that the rate of film formation is low, making it necessary to increase the caliber of the ion gun and increase the electric current for the power source of the ion gun so as to make the film formation rate sufficiently high. For example, according to the article "Collected Preliminary Papers for 1984 Autumn Meeting of Institutes of Metals", p. 470, an iron nitride thin film is formed under the condition that the nitrogen ion current density is 0.2 mA/cm$^2$ and the iron evaporation rate is 20 Å/sec. This evaporation rate is considerably lower than the evaporation rate (500-2000 Å/sec) of a CoNi-O magnetic recording medium, which has been widely investigated. However, it is very difficult technically to improve the ion current density in the case of using an ion gun.

The conventional method of producing a magnetic recording medium of the iron nitride thin-film type and the conventional apparatus for practicing this method have the foregoing disadvantages. Accordingly, it has been required to develop a method for producing a high quality magnetic recording medium of the iron nitride thin film type with a high production efficiency, and to develop an apparatus for practicing such as method.

SUMMARY OF THE INVENTION

It is therefore an object of the present invention to provide a method for efficiently producing a magnetic recording medium of the iron nitride thin-film type having good durability and resistance to corrosion and which also possesses a high coercive force, and also to provide an apparatus for practicing such a method.

The present inventors have investigated the forgoing problems in various ways. As a result of these investigations, the inventors have found that in forming an iron nitride thin film, if nitrogen molecules and/or atoms in an excited state are applied to a nonmagnetic substrate while an ion flow is simultaneously being applied to the substrate, nitrating can be performed more efficiently and the rate of formation of an iron nitride thin film is improved.

That is, the present invention provides a method for producing a magnetic recording medium in which an iron nitride ferromagnetic thin film containing at least iron and nitrogen is formed on a nonmagnetic substrate, wherein nitrogen molecules and/or atoms in an excited state are applied to the nonmagnetic substrate simultaneously with an iron vapor flow and an ion flow to thereby form the thin film on the nonmagnetic substrate.

The present invention further provides an apparatus for producing a magnetic recording medium comprising means for conveying a nonmagnetic substrate, means for evaporating metal, means for generating an ion flow, and means for generating nitrogen molecules and/or atoms in an excited state.

That is, in the conventional method for producing an iron nitride ferromagnetic thin film, an iron vapor flow and a nitrogen ion flow are applied to a nonmagnetic substrate thereby nitriding the iron. On the other hand, according to the present invention, nitrogen molecules and/or atoms in an excited state are applied to the nonmagnetic substrate simultaneously with an iron vapor flow and an ion flow supplied by an ion generating device thereby nitriding the iron with high efficiency and forming the iron nitride ferromagnetic thin film.

The present inventors have investigated and found that the aforementioned ion flow can control a crystal growth of the iron nitride and further have a function to improve the squareness ratio and the coercive force. In the conventional method, the nitrogen ion flow has performed both the nitrization of the iron and the control of the crystal growth. In contrast, according to the method of the present invention, nitrogen molecules and atoms in an excited state which readily nitrides the iron are applied simultaneously with the iron vapor flow and the ion flow. Therefore, nitriding can be performed more efficiently and the rate of formation of the iron nitride thin film is improved.

For the nonmagnetic substrate according to the present invention, it is preferable to use a substrate of plastics such as polyethylene terephthalate, polyimide, polyamide, polyvinyl chloride, cellulose triacetate, polycarbonate, or the like.

The ferromagnetic thin film according to the present invention is an iron nitride ferromagnetic thin film containing at least iron and nitrogen The term "iron nitride ferromagnetic thin film" as used herein means that the thin film is not always composed of a single iron nitride material but may contains $\alpha$-Fe, $\epsilon$-Fe$_{2-3}$N, $\gamma'$-Fe$_4$N, Fe$_8$N, etc. Further, as the present inventors have previously disclosed (see Japanese Unexamined Patent Publication No. 61-54023), oxygen may be contained in the ferromagnetic thin film, and in addition to the foregoing materials, iron oxide FeO$_x$ may be mixed in. Moreover, a ferromagnetic metal element such as cobalt, nickel, or the like, or a corrosion-resistant element such as Cr, Ti or Al may be suitably mixed in.

When an iron nitride ferromagnetic thin film is formed on a nonmagnetic substrate, an ion flow and an iron vapor flow are applied to the substrate simultaneously. Although the iron vapor flow may contain cobalt, nickel, etc., in addition to iron, it is preferable to make the iron vapor flow contain iron as the principal component. The iron vapor flow is obtained by evaporation in vacuum, that is, by evaporating a magnetic metal material containing iron as a principal component by electron beam heating, by high frequency induction heating, or the like. In order to obtain good magnetic properties, it is desirable to make the iron vapor flow obliquely onto the nonmagnetic substrate. Ions generated by an ion generating device are applied to a film forming portion in the form of an ion flow. It is desirable that the ion flow be generated and emitted by an ion gun because in such a case film formation can be easily controlled. The term "ion flow" as used herein means an ion flow as a principal component. The ion flow may contain nitrogen ions, oxygen ions, argon ions, etc.

Applying nitrogen molecules and/or atoms in an excited state to the substrate while the iron vapor flow and the nitrogen ion flow are simultaneously being applied to the substrate during film formation is the most remarkable feature of the present invention. The excited state of the nitrogen molecules and/or atoms may vary in various ways and various generating devices may be considered. It is necessary, however, that the excited state have a sufficiently long life relative to the ion transit time from the ion generation region to the film-forming region. It is preferable to use nitrogen atoms in view of reactivity, that is, because nitrogen atoms are more reactive than nitrogen molecules.

The excited state of nitrogen molecules or nitrogen atoms is easily generated by low temperature plasma.

Alternatively, an electromagnetic wave having a strong exciting capability, such as ultraviolet light X-rays or the like, may be used. The low temperature plasma may be generated by DC/AC glow discharge, high frequency discharge, an electron collision arrangement, or microwave discharge. (The distinction between high frequency discharge and electron collision is not always clear.) The nitrogen molecules and/or nitrogen atoms in the excited state in the above plasma region are utilized in film formation. It is desirable to select the most suitable conditions to increase the number of seeds of excitation having a long life as described above. For example, in the case of electron collision, an excited state of high density can be obtained if electrons are made to collide with nitrogen molecules at an energy of about 50–200 eV. It is a matter of course that the foregoing conditions vary depending on the apparatus used, and therefore the most suitable conditions must be established case by case for the individual apparatus.

The low temperature plasma may employ an ECR (Electron Cyclotron Resonance) discharge. If the ECR discharge is employed, high density plasma can readily be generated and further it is advantageous when using reactive gas since no thermal filament. In such a device, plasma can be effectively applied to the film formation portion by devergence magnetic field of an ECR plasma source.

Conventionally, no method in which nitrogen molecules and/or atoms in a excited state are applied to a nonmagnetic substrate while a nitrogen ion flow is being applied to the substrate during film formation has been known. That is, in the documents, patents, etc., discussed above, an explanation is given relative to the rate of iron evaporation, the nitrogen ion current density, the nitrogen partial pressure, etc., as parameters concerning film formation. No description is known about the allotment of parts of nitrogen molecules and/or atoms in an excited state.

Although a small quantity of molecules and/or atoms in an excited state is generated simultaneously with the generation of ions in the ion plating method, no arrangement for applying the generated molecules and/or atoms in an excited state to the film forming region is disclosed in the foregoing conventional examples. Therefore, the method according to the present invention in which nitrogen molecules and/or atoms in an excited state are applied to a substrate simultaneously with an nitrogen ion flow is broadly novel.

Further, according to the present invention, the ion flow is further applied to the film formation portion on the nonmagnetic substrate. The ion may be a inert-gas ion such as neon, argon and krypton, nitrogen ion and, further, oxigen molecule ion may be mixed if the ion flow should have a function of the oxidization. Further, the methane, acetylene and the like may be mixed if the ion flow should have a function of the carbonization. Thus, the ion can preferably selected according to its object. Generally, the argon ion may be utilized since it may take relatively low cost.

In the conventional method, the nitrogen ion flow is applied to the film formation portion on the substrate. However, the present inventors have investigated and found that any material of ion can be effective with respect to the control of the crystalization.

The necessary ion amount may be more than 5% of the Fe atom applied on the substrate and more preferably more that 10% thereof. If the ion amount is lower than the above specific value, the squareness rate may be deteriorated and, therefore, the necessary uniaxial anisotropy cannot be obtained. Further, the ion energy may preferably be between 50 eV and 1,000 eV. If the ion energy is lower than 50 eV, the acceleration voltage for generating the ion is low and accordingly the sufficient electric current cannot be obtained. Further, if the ion energy is higher than 1,000 eV, the sputtering effect may be excessive and therefore the film may hardly be formed.

Incident angle of the ion to the nonmagnetic substrate can be optionally selected since the incident angle of the ion may not influence the effect of the control of the crystallinity. However, the direction of the ion flow may preferably be parallel or substantially parallel to the direction of the vapor iron flow applied to the nonmagnetic substrate. If the direction of the ion flow deviates from the direction of the vapor iron flow, the squreness rate may be uniaxial anisotropy in the rate more than 0.85, since the coersive force intends to relatively be decreased.

The ion flow generated by the ion generating device is applied to the film formation portion on the substrate. An ion gun may preferably be utilized for generating the ion flow and applying since the film can be formed under high vacuum point and the control of which is easy if the ion gun is utilized.

The ion gun may preferably be of Kaufman type or Freeman type both for large current and having large caliber. Further, the ion gun of the end-holl type may be preferable since it can be for large current and low energy.

DESCRIPTION OF THE PREFERRED EMBODIMENTS

The present invention will now be described with respect to preferred embodiments. The present invention, however, is not limited to these embodiments.

EXAMPLE 1

Figure 1:
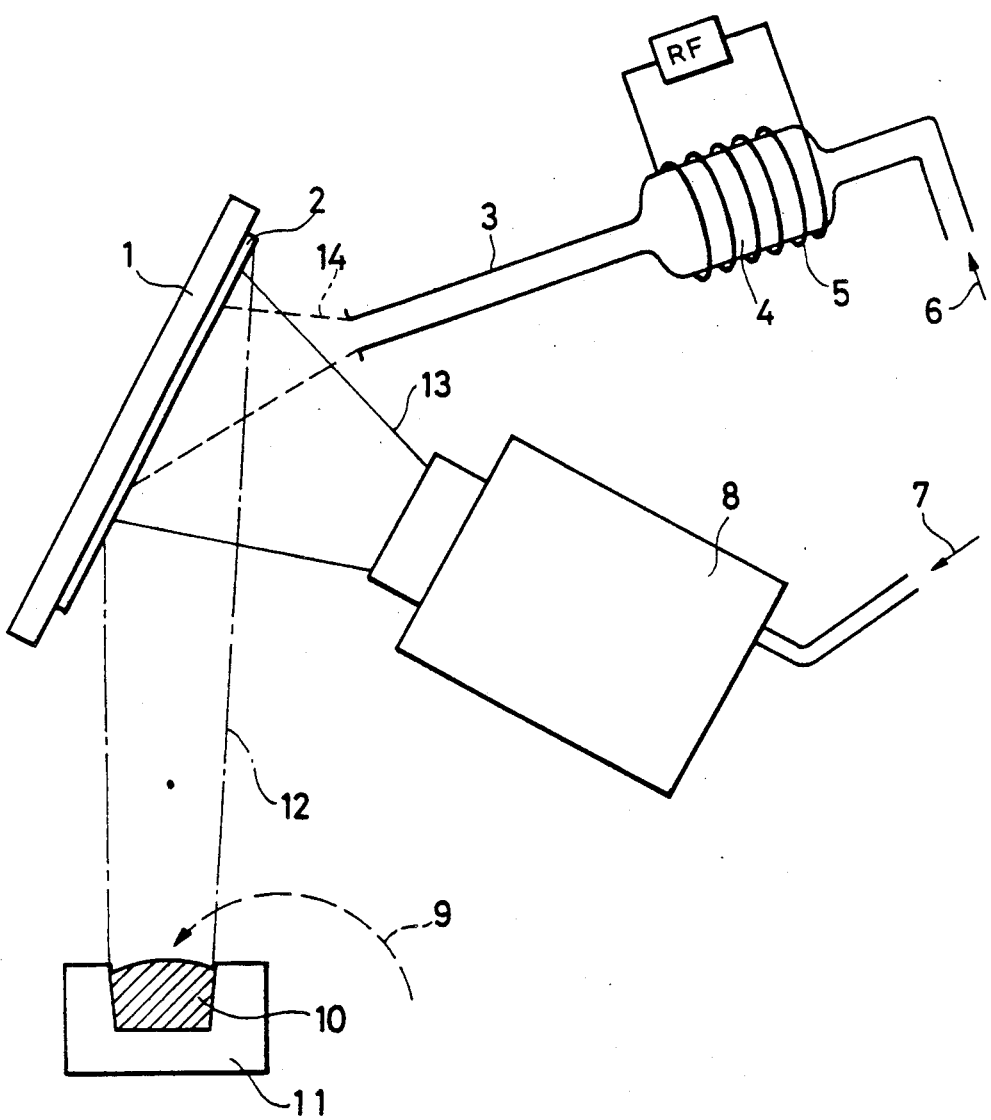
FIG. 1 shows a magnetic recording medium producing apparatus constructed according to the present invention.

An iron nitride thin film was formed on a polyethylene terephthalate film 2 having a thickness of 13 $\mu$m using an apparatus as shown in FIG. 1. First, after a vacuum chamber was exhausted of air to a vacuum degree of $1.0 \times 10^{-6}$ Torr, iron 10 in a crucible 11 made of magnesium was dissolved by heating by using electron beams 9 so as to obtain a predetermined evaporation rate (the evaporation rate and a film thickness being measure by a crystal vibration filter thickness monitor not shown in the drawings). The incident angle of oblique deposition is selected to be 65°.

Ar gas at a rate of 2 ml/min was introduced to gas inlet 7 whereas $N_2$ gas at a rate of 10 ml/min was introduced to another gas inlet 6, where the vacuum degree was $2.5 \times 10^{-4}$ Torr.

After that, ion gun 8 of Kaufmann type was actuated to be ready for applying argon ion flow 13. Acceleration voltage of the ion gun 8 was 0.4 kV and current of which was 20 mA. A plasma generating chamber 4 was surrounded by a coil 5 connected to an RF power source. In this device, plasma can be generated under power of 400 W.

Then, the electron beam 9, the ion gun 8 of Kaufmann type and the coil 5 were actuated so that nitrogen molecules and/or atoms in an excited state and the argon ion flow 13 were applied to the polyethylene terephthalate film 2 mounted on a film holder 1 simultaneously with an iron vapor flow to thereby form the thin film. The nitrogen molecules and atoms in an excited state were applied as a flow 14 of nitrogen molecules and/or atoms in an excited stated through a transferring tube 3. A rate of iron evaporation was varied sequentially at 5 Å/sec., 20 Å/sec., 50 Å/sec. and 100 Å/sec where total thickness of the film was to be 1500 Å.

A thickness of the film was detected by a film thickness monitor of the quartz-crystal type in order to control the rate of iron evaporation.

EXAMPLE 2

In the Example 1, nitrogen gas at a rate of 2 ml/min was introduced to the gas inlet 7 in place of the argon gas. A vacuum degree was $2.3 \times 10^{-4}$ Torr. Other conditions were the same as that of the Example 1 wherein total thickness of the film is to be 1500 Å.

COMPARATIVE EXAMPLE 1

In contrast to the Example 1, no power was applied to the coil 5 so that no plasma was generated in the plasma generating chamber 4. Nitrogen gas at a rate of 10 ml/min was applied under this condition. Other conditions were the same as that of Example 1 wherein total thickness of the film was to be 1500 Å.

COMPARATIVE EXAMPLE 2

In contrast to the Example 2, no nitrogen gas was applied to the gas inlet 6. Other conditions were the same as that of the Example 2 wherein total thickness of the film was to be 1500 Å.

Coercive force Hc of the iron nitride ferromagnetic thin film obtained in the above-mentioned Examples and the Comparative Examples were measured by a sample fluxmeter of oscillation VSM. The result will be described in Table 1 below.

TABLE 1

| Rate of iron Evaporation (Å/sec) | 5 | 20 | 50 | 100 |
|---|---|---|---|---|
| Example 1 | 1050 Oe | 930 Oe | 950 Oe | 790 Oe |
| Example 2 | 1000 Oe | 950 Oe | 965 Oe | 800 Oe |
| Comparative Example 1 | 410 Oe | 460 Oe | 430 Oe | 450 Oe |
| Comparative Example 2 | 930 Oe | 900 Oe | 420 Oe | 400 Oe |

As is apparent from the Example 1 and 2, the result employing the argon ion flow is not substantially different from that employing the nitrogen ion flow. Considering the Comparative Examples 1 and 2, coercive force Hc of the Comparative Examples are much lower than that of the Examples 1 and 2 at a same iron evaporation rate. Therefore, it is understandable that it is effective to apply nitrogen molecules and/or atoms in an exciting state generated by the plasma generating chamber simultaneously apply the iron vapor flow and the ion flow. The coercive force Hc of the Comparative Example 2 in which nitrogen gas was introduced to the ion gun 8 is higher than that of Comparative Example 1 in which argon gas was introduced to the ion gun 8 at the same film forming speed. Nevertheless, although coercive force of 930 Oe is obtained at the evaporation rate of iron of 5 Å in the Comparative Example 2, substantially the same coercive force Hc is obtained at the evaporation rate of iron of 20 Å in the Example 1, which is four times as much as that of the Comparative Example 2.

EXAMPLE 3

Figure 2:
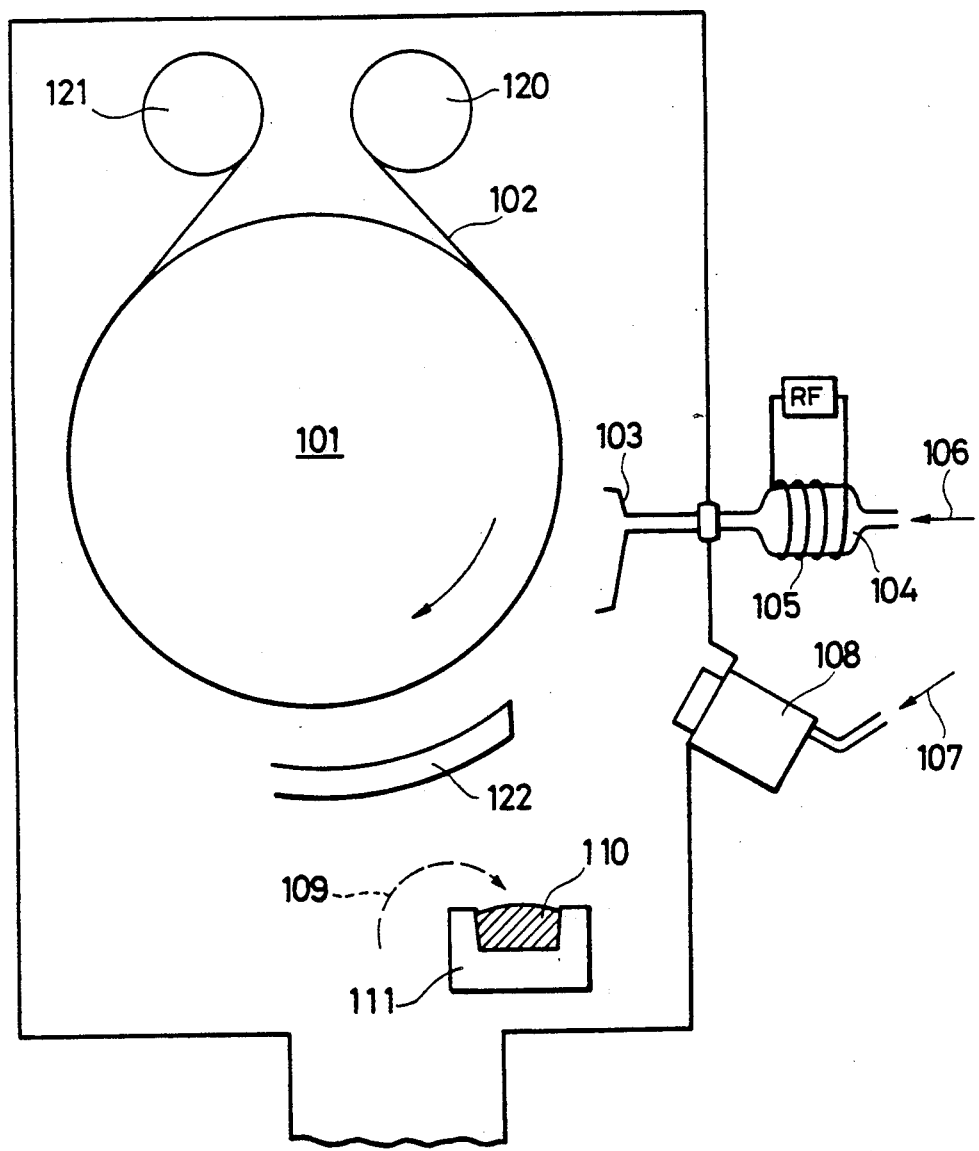
FIG. 2 shows an apparatus of a continuous roll-up type constructed according to the present invention.

In a continuous film forming device shown in FIG. 2, iron nitride ferromagnetic thin film a thickness of which is 1500 Å was formed on a polyethylene terephthalate film 102 a thickness of which is 13 um. A vacuum degree was at $1.0 \times 10^{-6}$ Torr. Under this condition, nitrogen gas at a rate of 30 ml/min and argon gas at a rate of 30 ml/min were introduced to a gas inlets 106 and 107, respectively. At this time, a vacuum degree was at $1.8 \times 10^{-4}$ Torr. The polyethylene terephthalate film 102 wound on a roll 120 was transferred at a speed of 1.0 m/min along the periphery of a cooling can 101. A thin film was formed on the film 102 while transferring and after that the film 102 was wound by a winding roll 121.

Iron 110 in a crucible 111 made of magnesium was melted by an electron beam 109. The iron vapor was transferred through a side of a shield plate 122 to the polyethelene terephthalate film 102 thereby forming iron nitride film on the film 102 by reacting with nitrogen. The iron 110 was vaporized under a predetermined condition by which a thickness of the thin film formed on the film 102 is to be 1500 Å. The incident angle of the evaporation was between 90° and 60°.

Power was applied to the ion gun 108 of Kaufman type and to the coil 105 wound on the plasma generating chamber 104 at the same value as that of the Example 1.

In the result of the Example 3, iron nitride thin film had a characteristic in which a coercive force Hc was 880 Oe and a squareness rate was 0.87.

COMPARATIVE EXAMPLE 3

In contrast to the Example 3, no power was applied to the coil 105 wound on the plasma generating chamber 104 so that no plasma was generated. In the result of the Comparative Example 3, the iron nitride thin film had a characteristic in which a coercive force was 530 Oe and a squareness ratio was 0.48. The characteristic of the iron nitride thin film of the Comparative Example 3 is clearly lower than that of the Example 3.

EXAMPLE 4

An iron nitride thin film was formed on a polyethylene terephthalate film 2 having a thickness of 13 μm using an apparatus as shown in FIG. 1. First, after a vacuum chamber was exhausted of air to a vacuum degree of $1.0 \times 10^{-6}$ Torr, iron 10 in a crucible 11 was dissolved by heating by using electron beams 9 so as to obtain a predetermined evaporation rate (the evaporation rate and a film thickness being measure by a crystal vibration filter thickness monitor not shown in the drawings). The incident angle of oblique deposition is selected to be 65°. Under this condition, a nitrogen gas was applied through gas inlets 6 and 7 at equal flow so that the vacuum degree was $5.0 \times 10^{-5}$ Torr. Thereafter, an ion gun 8 was actuated to apply a nitrogen ion flow 13 to a substrate. The acceleration voltage was 0.5 kV and the ion current was 20 mA. A coil 5 wound around a plasma generating chamber 4 was connected to a high frequency power source so that plasma was generated as required (plasma was generated when an RF current was applied while no plasma was generated when the RF current was off). When the RF current was on, a flow 14 of nitrogen molecules and/or atoms in an excited state was applied to the substrate. Under the above condition, films were formed to a total film thickness of 1500 Å while changing the iron evaporation rate from 5 Å/sec successively to 20 Å/sec, 50 Å/sec and 100 Å/sec. The coercive force of the thus-obtained media was measured by a vibration sample fluxmeter (VSM). The results of these measurement are listed in Table 2.

TABLE 2

| Rate of Iron Evaporation (Å/sec) | 5 | 20 | 50 | 100 |
|---|---|---|---|---|
| RF OFF | 900 Oe | 860 Oe | 430 Oe | 450 Oe |
| RF ON | 1020 Oe | 950 Oe | 960 Oe | 800 Oe |

That is, using the method and apparatus according to the present invention, a film having a high coercive force can be formed, even in regions where the iron evaporation rate high, and the rate of film formation can be made high.

Although a fixed substrate is used in this example, the same effects can be obtained also in the case of a continuous substrate if an apparatus as shown in FIG. 2 is used.

The method and apparatus according to the present invention exceedingly contribute to an improvement of productivity because a magnetic recording medium of the iron nitride thin-film type having superior corrosion resistance can be obtained at a high film forming rate.

Further, the thus-obtained magnetic recording medium is suitable for high density recording because of its high coercive force.

What is claimed is:

1. A method for producing a magnetic recording medium in which an iron nitride ferromagnetic thin film containing at least iron and nitrogen is formed on a nonmagnetic substrate, comprising the steps of: applying at least one of uncharged nitrogen molecules in an excited state and uncharged nitrogen atoms in an excited state to said nonmagnetic substrate; and simultaneously applying an uncharged iron vapor flow and a charged ion flow to said substrate to thereby form said thin film on said nonmagnetic substrate.

2. The method of claim 1, wherein said ion flow is a nitrogen ion flow.

3. The method of claim 1, wherein said ion flow is an argon ion flow.

4. The method of claim 1, wherein said ion flow is an oxygen ion flow.

5. The method of claim 1, wherein said iron vapor flow is directed at an oblique angle to a surface of said substrate.

6. The method of claim 5, wherein said oblique angle is approximately 65°.

7. The method of claim 1, wherein said iron flow is produced by an ion gun.

8. The method of claim 1, wherein said ion flow contains at least one of nitrogen ions, oxygen ions, and argon ions.

9. The method of claim 1, wherein said step of applying said at least one of nitrogen molecules and atoms in an excited state comprises exciting nitrogen by a low temperature plasma.

10. The method of claim 9, wherein said low temperature plasma is produced by DC/AC glow discharge.

11. The method of claim 9, wherein said low temperature plasma is produced by a high frequency discharge.

12. The method of claim 9, wherein said low temperature plasma is produced by electron collisions.

13. The method of claim 12, wherein an energy of said electron collisions is in a range of 50 to 200 eV.

14. The method of claim 9, wherein said low temperature plasma is produced by microwaves.

15. The method of claim 1, wherein said step of applying said at least one of nitrogen molecules and atoms in an excited state comprises exciting nitrogen by ultraviolet light X-rays.

* * * * *